United States Patent
Liao

(10) Patent No.: US 6,710,829 B2
(45) Date of Patent: Mar. 23, 2004

(54) METHOD OF PERFORMING A UNIFORM ILLUMINATION PATTERN IN A BACK-LIGHT PLATE USING A PRESS

(75) Inventor: Chi-Yu Liao, Taipei (TW)

(73) Assignee: BenQ Corporation, Tao-Yuan Hsien (TW)

( * ) Notice: Subject to any disclaimer, the term of this patent is extended or adjusted under 35 U.S.C. 154(b) by 356 days.

(21) Appl. No.: 09/779,463

(22) Filed: Feb. 9, 2001

(65) Prior Publication Data

US 2001/0040650 A1 Nov. 15, 2001

(30) Foreign Application Priority Data

May 3, 2000 (TW) .................................... 89108447 A

(51) Int. Cl.⁷ .............................................. G02F 1/1335
(52) U.S. Cl. ........................... 349/65; 349/64; 349/112
(58) Field of Search ............................. 349/64, 65, 112

(56) References Cited

U.S. PATENT DOCUMENTS 5,451,286 A * 9/1995 Nyborg .................... 156/274.4
5,844,720 A * 12/1998 Ohara et al. ................ 359/599
5,980,054 A * 11/1999 Fukui et al. .................. 362/31
6,199,995 B1 * 3/2001 Umemoto et al. ............ 362/31
6,522,373 B1 * 2/2003 Hira et al. ..................... 349/65

FOREIGN PATENT DOCUMENTS

| JP | 04278922 A | * 10/1992 | ......... G02F/1/1335 |
| JP | 10-082907 | 3/1998 | |
| TW | 216210 | 3/1991 | |
| TW | 284853 | 4/1995 | |
| TW | 283766 | 2/1996 | |

* cited by examiner

Primary Examiner—Tarifur R. Chardhury
Assistant Examiner—Andrew Schechter
(74) Attorney, Agent, or Firm—Winston Hsu

(57) ABSTRACT

A method of performing a uniform illumination pattern in a back-light plate by using a press. This method mainly utilizes a press with a plurality of protruding elements to press an illuminating face of the back-light plate. Accordingly, a plurality of recesses, each with a predetermined depth, are consequently formed to serve as a uniform illumination pattern of the back-light plate. When visible light incidents into the back-light plate, the plurality of recesses on the illuminating face make the back-light plate be uniformly illuminated.

4 Claims, 4 Drawing Sheets

METHOD OF PERFORMING A UNIFORM ILLUMINATION PATTERN IN A BACK-LIGHT PLATE USING A PRESS

BACKGROUND OF THE INVENTION

1. Field of the Invention

The present invention relates to a method of performing a uniform illumination pattern in a back-light plate. More specifically, the present invention relates to a method of performing a uniform illumination pattern in a back-light plate by pressing.

2. Description of the Prior Art

The inner light source of a scanner or a liquid crystal display (LCD) comprises a fluorescent tube and a back-light plate to form a back-light source, in order to scan a transparent document or to illuminate an LCD panel. Because the fluorescent tube is placed on one incident side of the back-light plate, the light emitted from the back-light plate is not uniformly distributed over the entire back-light plate. Light is especially brighter in the area near the incident side of the back-light plate. In order to solve the problem of non-uniform illumination, the prior art teaches to make plural spots on the back-light plate. The purpose of these spots is to reflect the light from the incident side of the back-light plate, so the light emitting from the illuminating face can be uniform.

Please refer to FIG. 1. FIG. 1 depicts a top view of a back-light plate 10 of the prior art. The prior art back-light plate 10 is a substantially flat and transparent plate structure, which comprises two parallel illuminating faces, and a substantially linear tube 12 is placed on one incident side of the back light plate 10. There are plural spots 16 on one illuminating face 14 of the back-light plate 10. These spots form a uniform illumination pattern. The farther the spot is away from the tube 12, the bigger the spot is, and the distance between the spot and its adjacent spots is shorter. On the contrary, the nearer the spot is from the tube 12, the smaller the spot is, and the distance between the adjacent spots is longer. When a visible light illuminating from the tube 12 incidents into the back-light plate 10 from the incident side, the plural spots of various sizes and different spacing distances make the emitting light uniformly distributed over the entire back-light plate 10. The prior art methods of performing the uniform illumination pattern on a back-light plate are mainly divided into two kinds: the printing method and the injection molding method. The printing method prints the spots 16 on the hard acrylic resin plate by hand. High cost and unstable printing quality are the main problems of this method. The printing quality is not easily under control. For example, the ink spreads when it is too much and it becomes non-uniform when the ink is not enough. Besides, this method cannot achieve the purpose of total reflection because ink tends to absorb light. As to the injection molding method, a pattern mold according to the design of uniform illumination pattern is needed. It is not only expensive, but also leads to inconvenience when molds of different pattern design are to be fabricated. Due to the aforementioned problems, there is indeed an urgent need to develop a new method to perform a uniform illumination pattern on a back-light plate in order to reduce the cost of materials and manufacturing, and hereby enhance competence of the manufacturer.

SUMMARY OF THE INVENTION

It is therefore a primary objective of this invention to provide a method of performing a uniform illumination pattern in a back-light plate utilizing a press. The present invention not only avoids the drawbacks in the prior arts, but also reduce the cost of materials, manufacturing, and their assembly.

The present invention provides a method utilizing a press with a plurality of protruding elements to press an illuminating face of the back-light plate so as to form a plurality of recesses with predetermined depths thereon. These recesses can work as a uniform illumination pattern on the back-light plate. When the visible light emitting into the back-light plate, the plurality of recesses on the illuminating face would make the emitting visible light illuminate uniformly on the back-light plate so as to achieve its originally intended purpose.

DETAILED DESCRIPTION OF THE PREFERRED EMBODIMENT

Figure 1:
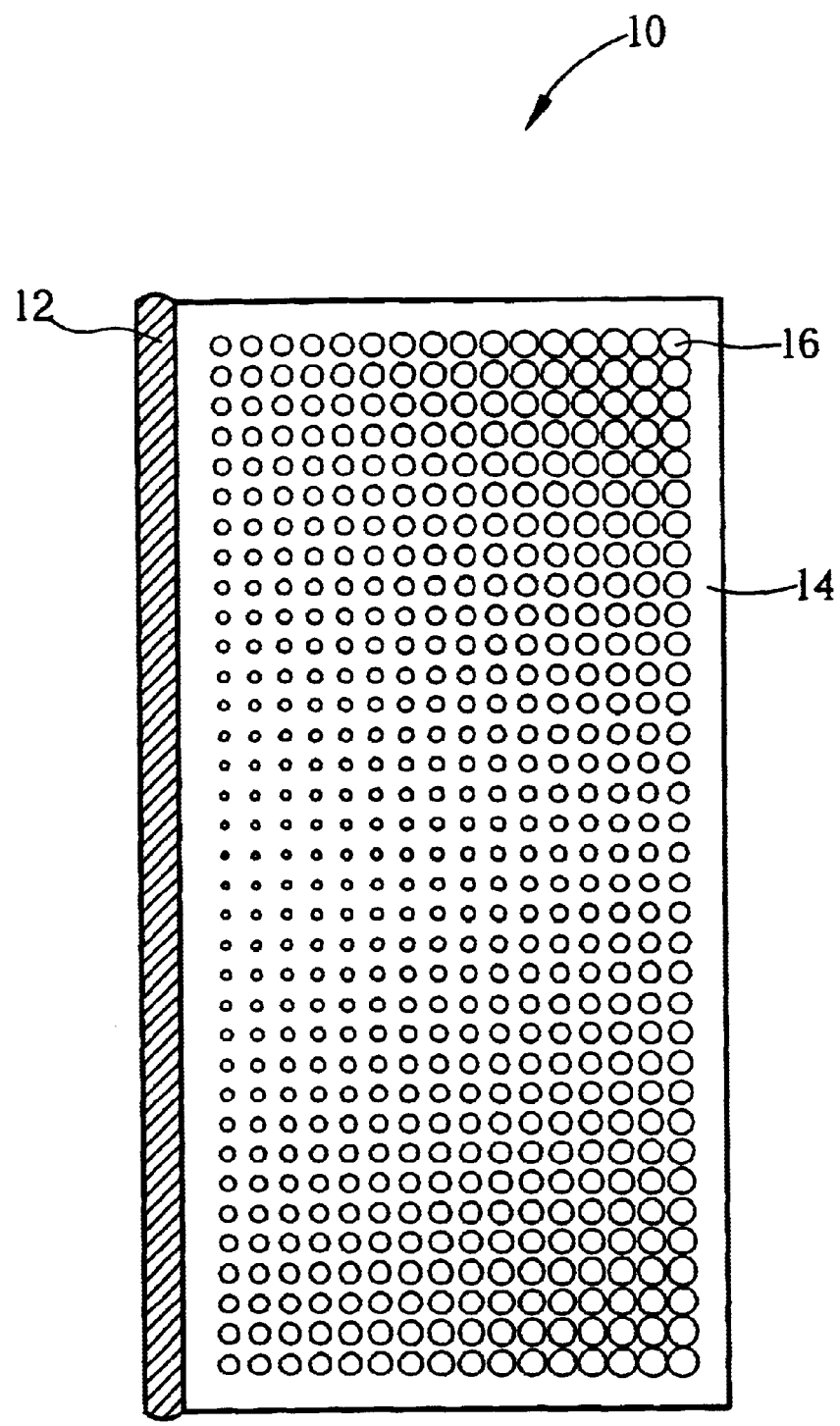
FIG. 1 depicts a top view of a back-light plate of the prior art.
Figure 2:
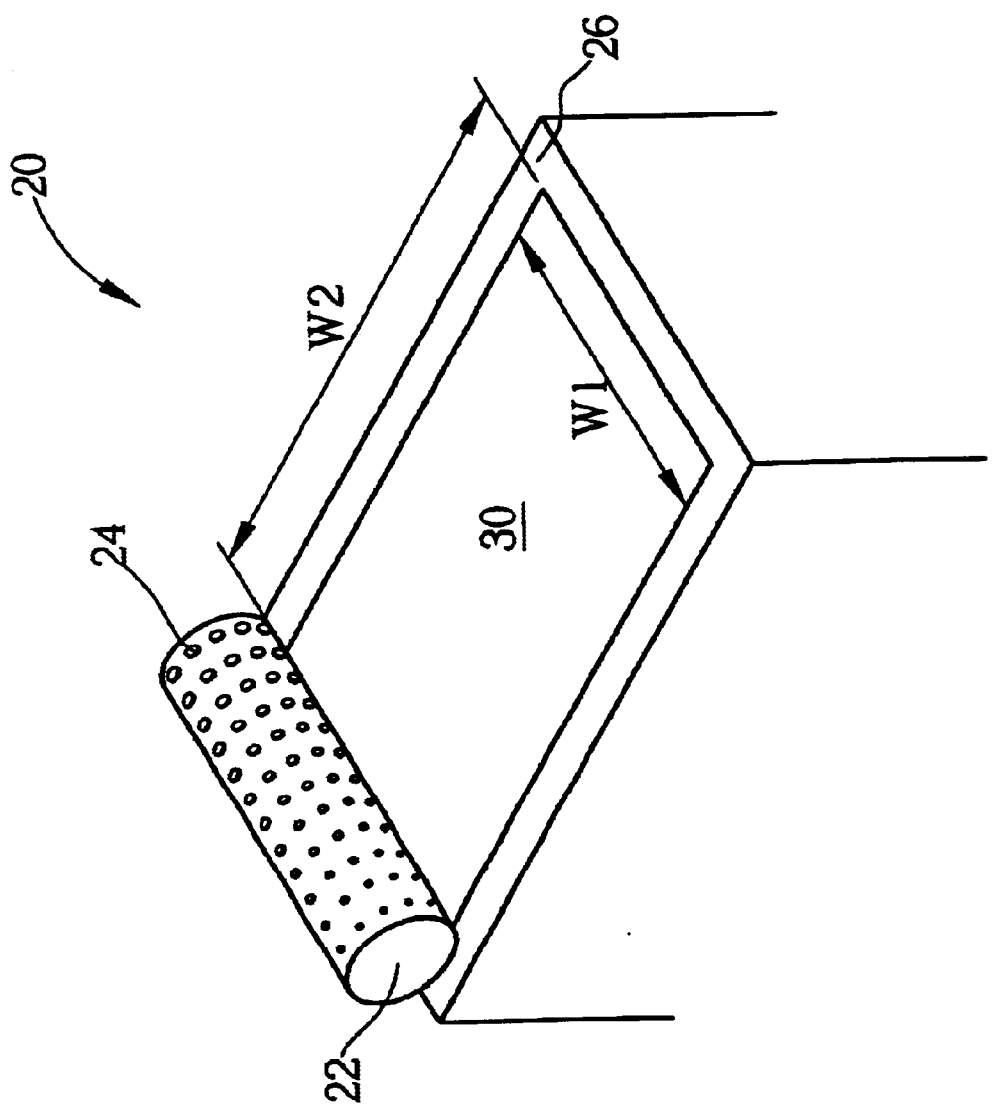
FIG. 2 and FIG. 3 are perspective views of manufacturing the back-light plate with a uniform illumination pattern thereon according to a first embodiment of the present invention.
Figure 3:
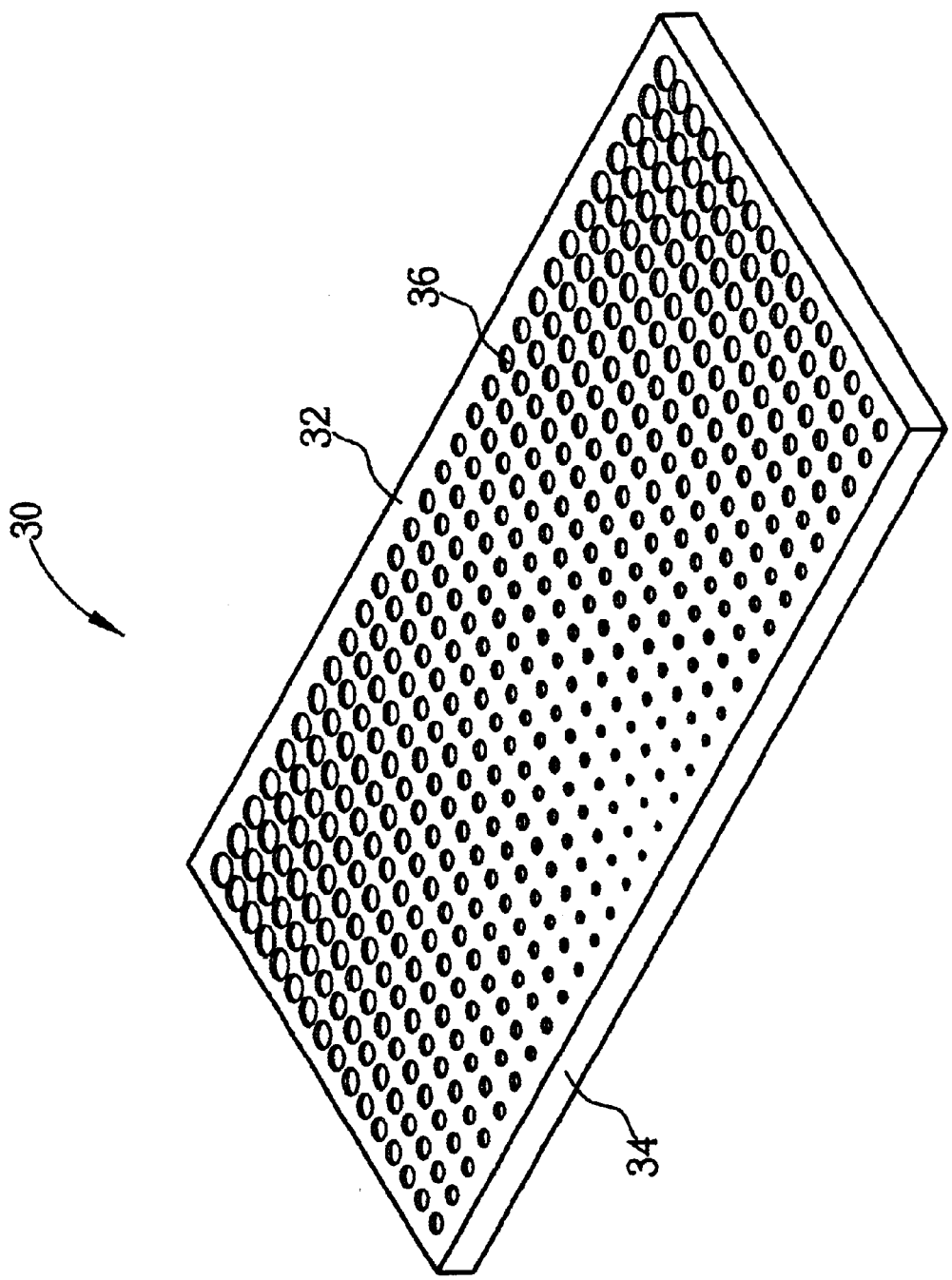

Please refer to FIG. 2 and FIG. 3. FIG. 2 and FIG. 3 are perspective views of manufacturing the back-light plate 30 and its uniform illumination pattern thereon according to a first embodiment of the present invention. The purpose of this embodiment is to provide a press 20 to press the surface of the back-light plate 30, in order to form a uniform illumination pattern. The back-light plate 30 is associated with a fluorescent tube (not shown) in a scanner to provide a back light source for scanning transparent documents, or to be used on a liquid crystal display (LCD) to form a back light source to illuminate an LCD panel. The back-light plate 30 is a substantially flat and transparent plate structure. It comprises two parallel illuminating faces 32 and a substantially linear incident side 34 on one side of the back-light plate 30. The press 20 comprises a roller 22 with a plurality of protruding elements 24 positioned on the roller's rolling surface, and a base 26 for holding the back-light plate 30.

As to the shape of the protruding elements 24, it can be designed as round, square, or hexagon. The sizes of the protruding elements 24 and their arrangement are designed in a special pattern to get a uniform illumination on the back-light plate 30. According to the uniform illumination pattern, the farther the protruding element 24 is away form the tube, the bigger the protruding element 24 is. In the meantime, the farther the protruding element 24 is away form the tube, the closer the protruding element 44 is arranged. The nearer the protruding element 24 is from the tube, the smaller the protruding element 24 is and arranged more sparsely. In the present embodiment, due to the irregularity arrangement of the special uniform illumination pattern to be formed on the back-light plate 30, it is better that the length of the roller 22 has selectively to be at least equal to or greater than the length of the first side W1 of the back-light plate 30, and the circumference of the roller 22 has selectively to be at least equal to or greater than the length of the second side W2 of the back-light plate 30. Such a design of the roller 22 ensures a uniform illumination pattern as expected on the back-light plate 30 with a higher pressing efficiency.

Before being pressed on the back-light plate 30, the press 20 is heated so as to make the plurality of protruding elements 24 easily pressed into the illuminating face 32 of the back-light plate 30. When the roller rolls against the illuminating face 32 of the back-light plate 30, the protruding elements 24 on the rolling surface of the roller 22 force the illuminating face 32 to form a plurality of recesses 36 thereon. The plurality of recesses 36, each with a predetermined depth, then serve as the uniform illumination pattern of the back-light plate 30. When a visible light incidents into the back-light plate 30, the uniform illumination pattern reflects the incident light to make the back-light plate 30 be uniformly illuminated. According to this embodiment, it is quite easy to utilize the roller 22 rolling against the back-light plate 30, the cost of material and manpower can be reduced, and mis-registration of the uniform illumination pattern can also be avoided.

Figure 4:
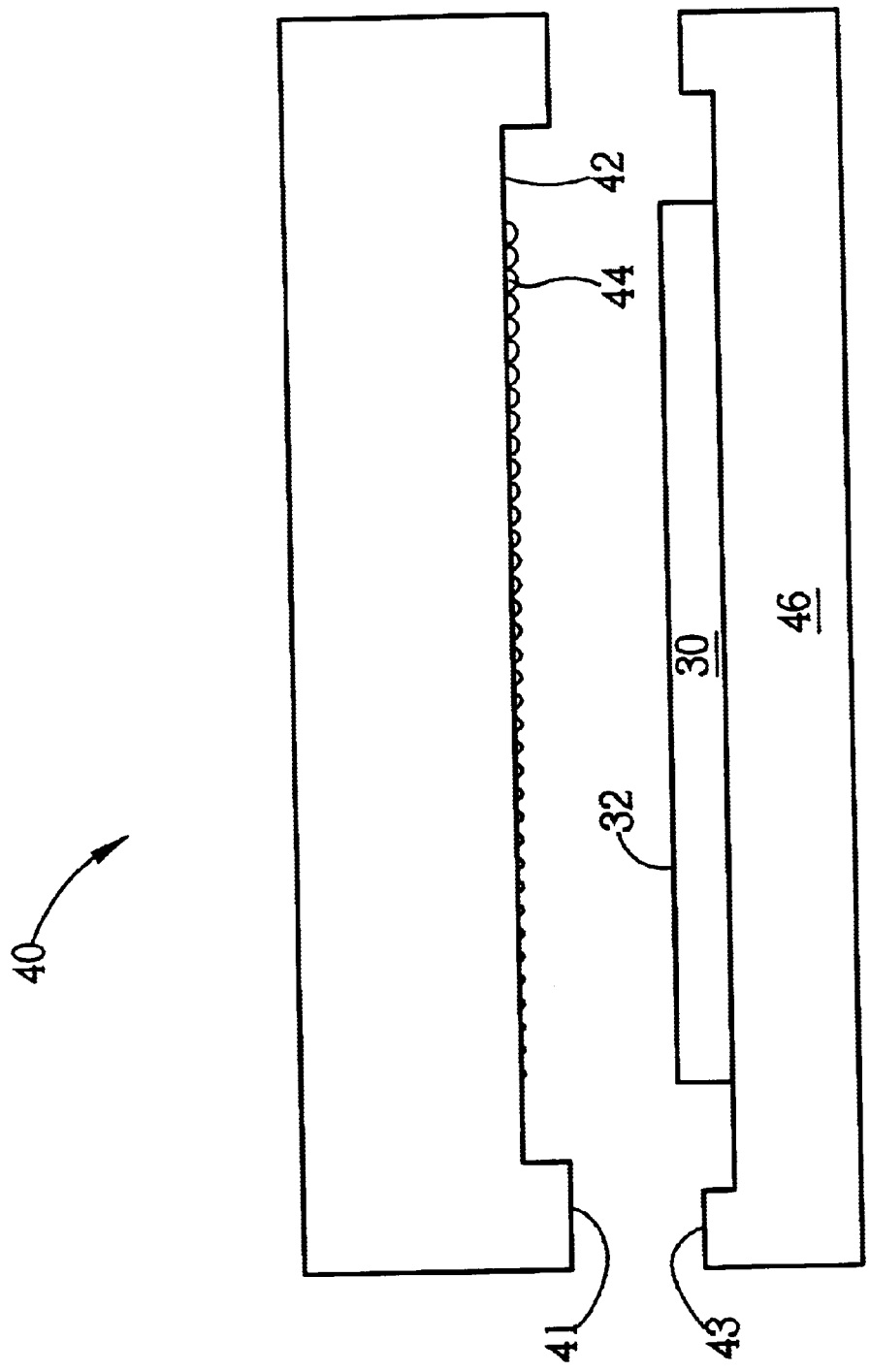
FIG. 4 is a perspective view of manufacturing the back-light plate and its uniform illumination pattern thereon according to a second embodiment of the present invention.

Please refer to FIG. 4. FIG. 4 is a perspective view of manufacturing the back-light plate 30 and its uniform illumination pattern thereon according to a second embodiment of the present invention. The purpose of this embodiment is to provide another press 40. The press 40 comprises a substantially flat pressing face 42 with a plurality of protruding elements 44 formed thereon, and a base 46 for holding the back-light plate 30. As to the shape of the protruding elements 44, it can be designed as round, square, or hexagon. The sizes of the protruding elements 44 and their arrangement are in accordance with the design of uniform illumination pattern to be formed on the back-light plate 30. The farther the protruding element 44 is away form the tube, the bigger the protruding element 44 is. Also, the farther the protruding element 24 is away form the tube, the closer the protruding element 44 is arranged, vice versa.

Before being pressed on the back-light plate 30, the press 40 is heated to make the plurality of protruding elements 44 be easily pressed into the illuminating face 32 of the back-light plate 30. When the flat pressing face 42 of the press 40 presses against the illuminating face 32 of the back-light plate 30, the plurality of protruding elements 44 on the flat pressing face 42 force the illuminating face 32 to form a plurality of recesses 36 thereon. The plurality of recesses 36, each with a predetermined depth, then serve as the uniform illumination pattern of the back-light plate 30, as shown in FIG. 3.

A first depth limiter 41 is positioned on the periphery of the pressing face 42. And a second depth limiter 43 is positioned on the periphery of the base 46. When the pressing face 42 exerts force on the base 46, the plurality of protruding elements 44 of the pressing face 42 would create a plurality of recesses 36 on the illuminating face 32, and the first depth limiter 41 would touch against the second depth limiter 43. In this way, the recesses 36 are controlled in predetermined depths. When a visible light incidents into the back-light plate 30 from the incident side 34, the uniform illumination pattern reflects the incident light to make the back-light plate 30 uniformly illuminated.

In contrast to the prior art methods of forming the back-light plate 10, the invention utilizes a press 20, 40 to form a plurality of recesses 36 on the illuminating face 32 of the back-light plate 30. The recesses 36 with predetermined depths therefore serve as the uniform illumination pattern. By means of the press, the present invention provides a simple, however advantageous, solution to perform the uniform illumination pattern on the back-light plate. With this solution, the cost of material and manpower can be reduced, and mis-registration of the uniform illumination pattern can also be avoided.

Those skilled in the art will readily observe that numerous modifications and alterations of the device may be made while retaining the teachings of the invention. Accordingly, the above disclosure should be understood to be limited only by the bounds of the following claims.

What is claimed is:

1. A method of forming a uniform illumination pattern in a back-light plate, the back-light plate comprising two parallel illuminating faces and an incident side on one side of the back-light plate, and when a visible light incidents from the incident side into the back-light plate, the back-light plate reflect the visible light through the two illuminating faces, the method utilizing a press with a plurality of protruding elements to press an illuminating face of the back-light plate so as to form a plurality of recesses with predetermined depths thereon;

wherein the plurality of recesses forms the uniform illumination pattern on the back-light plate to make the back-light plate uniformly illuminated when the visible light incidents into the back-light plate;

wherein the press comprises a roller, the plurality of protruding elements being formed on a rolling surface of the roller, the circumference of the roller being equal to or greater than the length of the back-light plate.

2. The method of claim 1 wherein the back-light plate is utilized inside a flat-bed scanner for generating a back-light source to scan a transparent document, or is utilized in an LCD monitor for generating a back-light source to illuminate an LCD-panel.

3. The method of claim 1 wherein the recess size and the spacing with its adjacent recess depend on the distance between the recess and the incident side of the back-light plate, and when the distanc b tween the recess and the incident side is longer, the recess size is designed larger and the spacing with its adjacent recess is designed shorter.

4. The method of claim 1 wherein the press is heated to make the plurality of protruding elements easily pressed into the illuminating face of the back-light plate before being pressed on the back-light plate.

\* \* \* \* \*